(12) United States Patent
Kandler (10) Patent No.: US 8,011,234 B2
(45) Date of Patent: Sep. 6, 2011

(54) SENSOR SYSTEM FOR A STEERING WHEEL OF A MOTOR VEHICLE

(75) Inventor: Marcus Kandler, Florssbachtal (DE)

(73) Assignee: Takata-Petri AG, Aschaffenburg (DE)

( * ) Notice: Subject to any disclaimer, the term of this patent is extended or adjusted under 35 U.S.C. 154(b) by 322 days.

(21) Appl. No.: 12/306,172

(22) PCT Filed: Jun. 5, 2007

(86) PCT No.: PCT/EP2007/055511
§ 371 (c)(1), (2), (4) Date: Dec. 22, 2008

(87) PCT Pub. No.: WO2008/003558
PCT Pub. Date: Jan. 10, 2008

(65) Prior Publication Data
US 2009/0199676 A1 Aug. 13, 2009

(30) Foreign Application Priority Data
Jul. 3, 2006 (DE) .......................... 10 2006 031 207

(51) Int. Cl.
*G01M 17/06* (2006.01)
(52) U.S. Cl. .................................. 73/117.02
(58) Field of Classification Search ............... 73/117.01, 73/117.02
See application file for complete search history.

(56) References Cited

U.S. PATENT DOCUMENTS

| | | | |
|---|---|---|---|
| 6,293,361 B1 * | 9/2001 | Mueller | 180/272 |
| 7,044,021 B2 | 5/2006 | Lorenz | |
| 7,602,278 B2 * | 10/2009 | Prost-Fin et al. | 340/438 |
| 7,710,279 B1 * | 5/2010 | Fields | 340/575 |
| 2003/0111278 A1 * | 6/2003 | Hauer et al. | 180/6.28 |
| 2004/0025624 A1 | 2/2004 | Kreuzer | |
| 2004/0267422 A1 | 12/2004 | Bossler et al. | |
| 2006/0022442 A1 * | 2/2006 | Rubboli | 280/731 |
| 2010/0030429 A1 * | 2/2010 | Kuramori | 701/42 |

FOREIGN PATENT DOCUMENTS

| | | |
|---|---|---|
| DE | 42 42 230 A1 | 6/1994 |
| DE | 198 02 249 C2 | 9/1999 |
| DE | 100 48 956 C1 | 5/2002 |
| DE | 202 12 398 U1 | 1/2003 |
| DE | 203 09 603 U1 | 10/2003 |
| DE | 203 09 877 U1 | 12/2003 |
| DE | 10 2004 062 040 A1 | 7/2006 |

(Continued)

OTHER PUBLICATIONS

English translation of the International Preliminary Report on Patentability (Chapter I of the Patent Cooperation Treaty) from the International Bureau of WIPO for International Application No. PCT/EP2007/055511 dated Jan. 29, 2009, 7 pages.

(Continued)

*Primary Examiner* — Eric S McCall
(74) *Attorney, Agent, or Firm* — Fitch Even Tabin & Flannery (57) ABSTRACT

A sensor system for a steering wheel of a motor vehicle is provided, characterized in that, in one form, in and/or on a steering wheel rim at least one sensor device for recording the effects of an acceleration is arranged. Rapid and effective reactions can thus be made to impact events, for example.

22 Claims, 6 Drawing Sheets

FOREIGN PATENT DOCUMENTS

| | | |
|---|---|---|
| DE | 20 2006 005 593 U1 | 10/2006 |
| EP | 0 930 192 A2 | 7/1999 |
| EP | 1 319 571 A2 | 6/2003 |
| EP | 1 491 409 A1 | 12/2004 |
| EP | 1 621 442 A2 | 2/2006 |
| EP | 1 842 761 A2 | 10/2007 |
| WO | 2006/069746 A1 | 7/2006 |

OTHER PUBLICATIONS

Notification of the First Office Action issued in counterpart Chinese Application No. 200780018063.8 dated Jun. 2, 2010 (6 pages) and an English translation of the same (5 pages).

* cited by examiner

SENSOR SYSTEM FOR A STEERING WHEEL OF A MOTOR VEHICLE

CROSS-REFERENCE TO RELATED APPLICATIONS

This application is a U.S. national phase application filed under 35 U.S.C. §371 of International Application PCT/EP2007/055511, filed on Jun. 5, 2007, designating the United States, which claims priority from DE 10 2006 031 207.4, filed Jul. 3, 2006, which are hereby incorporated herein by reference in their entirety.

FIELD OF THE INVENTION

The invention relates to a sensor system for a steering wheel and to a steering wheel.

BACKGROUND OF THE INVENTION

In vehicle engineering there is a constant need to improve the active and passive safety of a motor vehicle. In order to improve both the active and passive safety it is necessary for travel data of the motor vehicle to be acquired and further processed quickly and reliably. This is the only way that safety-related devices for active safety (for example ABS systems) or for passive safety (for example airbags) can be actuated.

These systems can operate reliably only if relevant data is acquired efficiently by means of sensors. For example, in the event of an impact an impulse is applied to the motor vehicle in a very short time.

SUMMARY OF THE INVENTION

The present invention is based on the object of providing a device with which it is possible to react, in particular, to impact events quickly and efficiently.

The object is achieved by virtue of the fact that at least one sensor means for sensing the effect of an acceleration is arranged in and/or on a steering wheel rim.

It is particularly advantageous if the steering wheel rim has at least one electrical outer conductor and at least one electrical inner conductor for forming a coaxial arrangement. As a result, module-integral components can be used within the scope of the sensor means.

In addition it is advantageous if the sensor means senses the field effect, the force effect and/or the resulting deformation of part of the steering wheel relative to the at least one outer conductor and/or to the at least one inner conductor. These variables can be sensed satisfactorily and constitute a measure of the acceleration or its effect. An effect is, for example, an oscillation which propagates in the steering wheel as far as the steering wheel rim.

A simple design is obtained if the sensor means senses the distance between two parts of the steering wheel rim.

An advantageous measurement principle is obtained if the at least one sensor means has a capacitive and/or an inductive sensor unit or is coupled to a capacitive and/or inductive sensor unit. In conjunction with a coaxial arrangement it is advantageous if the capacitive and/or inductive sensor unit is coupled to parts of the steering wheel, in particular the at least one outer conductor and at least one inner conductor with different masses, rigidity and/or densities so that a signal for sensing the acceleration can be generated from the deformation of the parts.

An advantageous embodiment of the sensor system has a transmitting means, in particular at least one antenna loop for emitting a coaxial wave, a TE wave, a TM wave, a TEM wave and/or a wave, and a sensor means for detecting a reflection of the coaxial wave, of the TE wave, of the TM wave, of the TEM wave and/or of the wave. It is particularly advantageous here if at least two conductor loops are arranged in the steering wheel rim. If four conductor loops are advantageously arranged symmetrically in the steering wheel rim, in particular each in a quadrant, direction sensing is possible in a particularly efficient way. It is also advantageous if at least one antenna loop and/or at least one conductor loop can be used for direction-indicating detection of a force effect.

Furthermore it is advantageous if the receiver means senses a change in a property of the coaxial wave, in particular a field line change and/or attenuation as a function of a relative movement of parts of the steering wheel. The receiver means advantageously senses the reflection factor.

A particularly simple design is obtained if the skeleton of the steering wheel rim is embodied at least partially as an inner conductor. A further advantageous embodiment is that a steering wheel heating device is embodied in the steering wheel rim, at least partially as an outer conductor.

The change in signals in the interior of the steering wheel rim can be influenced by arranging at least one dielectric element in the steering wheel rim. It is particularly advantageous if the dielectric element is arranged as a foamed material jacket and/or liquid container in the steering wheel rim.

The steering wheel rim is advantageously electrically insulated with respect to the steering wheel plate.

According to the invention, the influence of an acceleration can be sensed, and in this context it is advantageous if a triggering means for an airbag fires the airbag as a function of a triggering signal which is generated by the sensor means.

So that the sensor means does not respond when customary accelerations occur in the motor vehicle, it is advantageous that the triggering signal is not output by the sensor means until the effect of the acceleration exceeds a predetermined value.

The object is also achieved by means of a steering wheel having a sensor system according to the invention.

BRIEF DESCRIPTION OF THE DRAWINGS

The invention is explained in more detail below with reference to the figures of the drawings and using a plurality of exemplary embodiments. In said drawings.

DETAILED DESCRIPTION OF THE PREFERRED EMBODIMENTS

In the event of an impact a negative acceleration acts via a force effect to bring about different deformations of the bodywork of the motor vehicle and parts of the motor vehicle. The acceleration and its force effect depend here on the mass of the respective part of the motor vehicle, i.e. when there is an identical force effect, relatively lightweight parts of the motor vehicle are accelerated less than relatively heavy parts of the motor vehicle. The acceleration can also be manifest in the form of an oscillation.

In the text which follows, different embodiments of a sensor system according to the invention are presented, in each of which embodiments a sensor means 1, with which the acceleration B acting on the vehicle can be sensed quickly and efficiently, is provided.

In this context, in the first three embodiments the sensor means 1 is coupled to a coaxial arrangement having an outer conductor 1A and an inner conductor 1B. The input signals 4 of the sensor means 1 are generated by means of electrical interactions between the outer conductor 1A and the inner conductor 1B, with the interactions resulting from the acceleration effects acting on the steering wheel or parts thereof.

The first group of embodiments relates to changes in the capacitance C and/or the inductance L in the steering wheel rim 10 which are converted into output signals 5 by the sensor means 1. The output signals 5 are used to address other parts of the motor vehicle or trigger them. An output signal 5 can therefore be used to trigger an airbag (not illustrated) in the steering wheel if a predetermined value for the acceleration B is reached).

In addition, the sensor means 1 has an inductive sensor unit 2 and/or a capacitive sensor unit 3.

The changes in the capacitance and/or the inductances are brought about by changes in the distances between parts of the steering wheel rim 10, specifically the outer conductor 1A and the inner conductor 1B. The changes in distance can be attributed to different accelerations (for example force effects) within the steering wheel rim 10.

Figure 1:
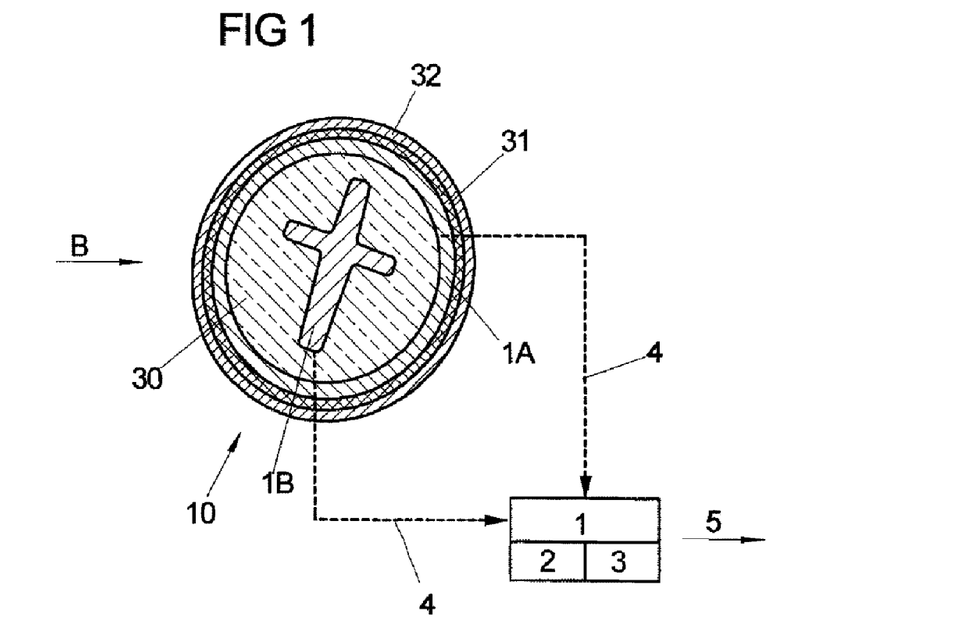
FIG. 1 is a schematic sectional view through a steering wheel rim with a first embodiment of the sensor system.

FIG. 1 illustrates a first embodiment in which the capacitance is used as a measurement variable.

FIG. 1 illustrates a section through a steering wheel rim 10 which has the following design from the inside to the outside. The skeleton of the steering wheel rim 10, which forms the electrically conductive inner conductor 1A of a coaxial arrangement here is arranged in the interior. The skeleton 1A is surrounded by a foamed layer, which is embodied here as a dielectric element 30.

The foamed layer 30 is surrounded by two shielding means in this embodiment. A heating web 1B on the circumference of the steering wheel rim 10 forms the outer conductor 1B of the coaxial arrangement. In addition, but not absolutely necessarily, a further shielding layer 31 is arranged inside the outer conductor 1A. Basically, a plurality of heating webs can also be used.

On the outside, the steering wheel rim is surrounded by a sheath 32 which can be composed of wood, leather or plastic.

The coaxial arrangement with an inner conductor 1B and outer conductor 1A is to be conceived of in a first approximation as a coaxial cable whose capacitance C is given by $$C = \frac{Q}{U} = \frac{2\pi \varepsilon l}{\ln \frac{r_A}{r_I}}$$

Here l is the length of the coaxial arrangement (for example the length of the steering wheel rim 10, $r_I$ is the radius of the inner conductor 1B and $r_A$ is the radius of the outer conductor 1A. In the embodiment according to FIG. 1, the steering wheel skeleton 1B does not have a circular cross section so that this equation applies only approximately.

As a result of an acceleration B which acts on the steering wheel rim 10, the geometric relationships in the steering wheel rim 10 change. As a result of a compression of the dielectric element 30, i.e. the foamed layer, the distance between the inner conductor 1B and the outer conductor 1A changes, which can be measured as a change in capacitance according to the above equation. If the distance between the outer conductor 1A and the inner conductor 1B decreases (given a constant diameter of the inner conductor 1B), the capacitance drops.

Figure 2:
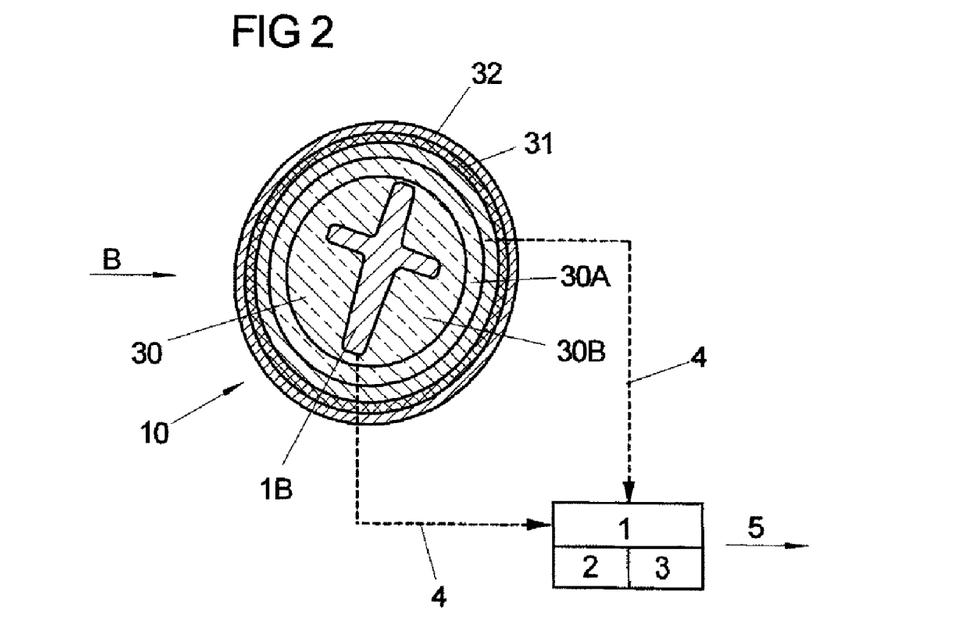
FIG. 2 is a schematic sectional view through a steering wheel rim with a second embodiment of the sensor system.

In a second embodiment according to FIG. 2, the basic design of the first embodiment is adopted so that reference can be made to the corresponding explanations.

However, the dielectric element 30 is divided into two layers 30A, 30B here. The foamed component in the first layer 30A has here a different density or a different compression module from the foamed component in the second layer 30B. A difference in the compression module indicates the degree to which the foam can be compressed under loading.

The two embodiments according to FIGS. 1 and 2 have been described in relation to a capacitive measurement method.

Alternatively or additionally it is also possible to apply an inductive measurement method. The acceleration or force effect on the steering wheel rim and its parts also brings about a change in the inductance L.

In the case of a coaxial cable arrangement, which can be approximately assumed, the inductance is given as $$L = \frac{\mu_0 \mu_r l}{2\pi} \left( \ln \frac{r_A}{r_I} + 0.25 \right)$$

If the distance $r_A$ between the outer conductor 1A and inner conductor 1B decreases, the inductance drops.

The embodiments according to FIGS. 1 and 2 have been illustrated here independently of the frequency. The embodiments can, however, readily also have a frequency-dependent evaluation so that amplitude signals and/or phase signals can be evaluated.

A third embodiment of the sensor system according to the invention is also based on a coaxial arrangement, but the effect of an acceleration is determined in a different way.

Here, the same coaxial basis configuration as that described in FIG. 1 or 2 is assumed. Here, the influence of the field lines of a coaxial wave and/or a wave which is located in the steering wheel rim 10 is used as the measurement variable. Here, the dielectric constant of the dielectric 30 (for example foamed material) is responsible for the propagation of the coaxial wave.

Figure 3A:
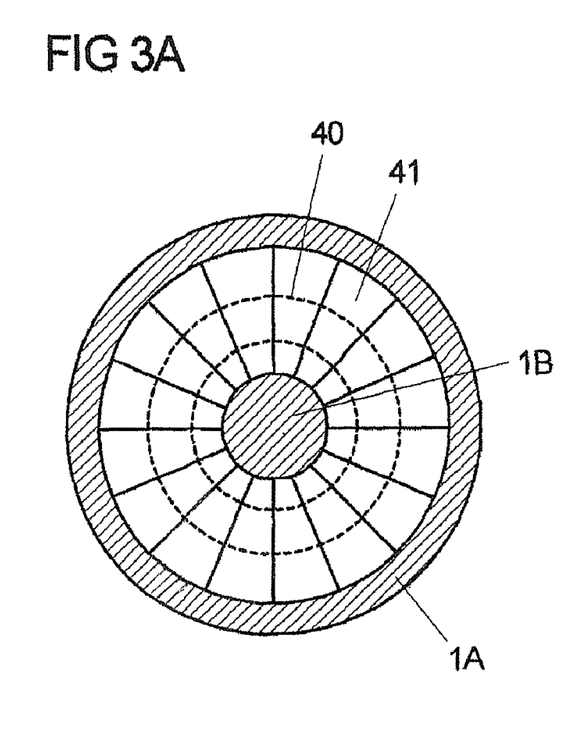
FIG. 3A is a cross section through a steering wheel rim with a coaxial arrangement.
Figure 3B:
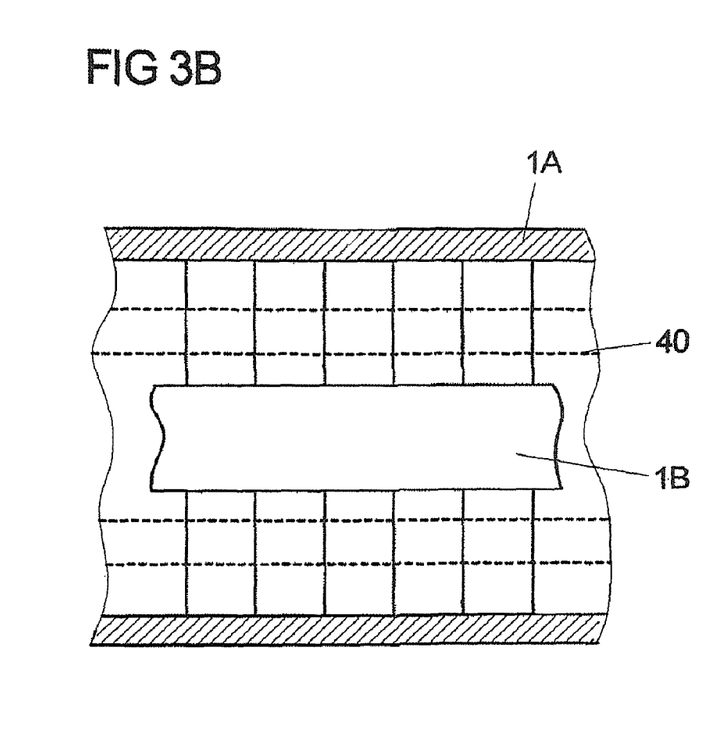
FIG. 3B is a longitudinal section through a steering wheel rim with a coaxial arrangement.

In the text which follows, the basic principles of this embodiment are presented in relation to a steering wheel rim, with reference being made to FIGS. 3A and 3B. FIG. 3A shows a cross section through a coaxial arrangement, and FIG. 3B shows a longitudinal section. The curvature of the steering wheel rim is ignored in FIGS. 3A and 3B.

The electrical field lines of the coaxial wave (TEM wave) in which no field strength components occur in the direction of the line axis (perpendicular to the plane of the drawing in FIG. 3A) run radially in the cross-sectional plane. The character of the field is also determined by the equipotential lines 40 (annular) shown as a dashed line in FIG. 3A. Between two adjacent lines 40 of equal potential the same voltage difference $\Delta U = U/m$ is present if U is the total voltage between the conductors 1A, 1B and m is the number of strips of equal potential difference. In FIG. 3A, m=3 since three concentric rings are assumed.

In contrast, the field lines divide the cross section into n strips 41 of equal capacitance and in FIG. 3A n=16. The capacitance $C_S$ of such a strip 41 of equal capacitance results from the series connection of the elementary capacitances $C_E$ (box), $C_S=C_E/m$ which are formed by the lines of equal potential and bounded by the field lines.

The line capacitance per cm line length, referred to as capacitance per unit length C', can then be determined by a parallel connection of the in n=16 equal capacitances $C_S$, that is to say from the sum $$C' = \sum C_s = \varepsilon_0 \varepsilon_r \frac{n}{m}$$

As a numerical value equation in pF/cm:

$$C' = 0.089 \varepsilon_r \frac{n}{m}$$

The inductance of the line per centimeter line length, referred to as the inductance per unit length L', can also be obtained from the field form. For a homogeneous dielectric with permeability $\mu_r$ the following applies:

$$L' = \mu_0 \mu_r \frac{m}{n}$$

or in numbers (nH/cm)

$$L' = 4\pi \mu_r \frac{m}{n}$$

The characteristic impedance Z (in Ohms) is the quotient of the voltage and current of the progressive coaxial wave measured at any point on a loss-free high-frequency line. It is real for loss-free lines and therefore:

$$Z = \sqrt{\frac{L'}{C'}} = \frac{m}{n}\sqrt{\frac{\mu_0}{\varepsilon_0}\frac{\mu_r}{\varepsilon_r}}$$

with $\sqrt{\frac{\mu_0}{\varepsilon_0}} = 120$ is $$Z = \frac{377m}{n}\sqrt{\frac{\mu_r \mu_0 \mu_m}{\varepsilon_r \varepsilon_0 \varepsilon_m}}$$

In the above equation, m signifies the number of dielectrics or permeabilities.

Since the characteristic impedance therefore constitutes a constant value for the total coaxial value for the total line path, it can also be given as a function of the internal diameter D of the outer diameter 1A and of the external diameter of the inner conductor 1B:

$$Z = \frac{60}{\sqrt{\varepsilon_r}} \ln \frac{D}{d}$$

where $\varepsilon_r$ is the relative dielectric constant of the dielectric between the inner conductor 1A, and outer conductor 1B.

The determining characteristic variable for a coaxial connection is therefore the characteristic impedance Z.

From the above relationship for the characteristic impedance Z it becomes clear that a change in the diameter has an influence on the characteristic impedance Z which can be detected. This is described in more detail below. If, for example, the diameter D is smaller, the characteristic impedance Z also drops.

Attenuation and Skin Effect

The sum of the following loss components produces the attenuation of electromagnetic waves on the coaxial line:
$\alpha_i$ resistive attenuation of the inner conductor 1B
$\alpha_A$ resistive attenuation of the outer conductor 1A
$\alpha_G$ leakage attenuation For the attenuation α the following applies generally $\alpha=\alpha_R+\alpha_G$. Here, $\alpha_L=\alpha_i+\alpha_a$ the absolute value of what is referred to as the longitudinal attenuation.

The resistive attenuation values are decisively influenced by the skin effect which is effective at high frequencies.

For the calculation of the loss values it is necessary that the currents only flow in a uniformly distributed fashion in what is referred to as an equivalent conductive layer thickness. In the case of nonmagnetic materials—where $\mu_r=1$—the conduction layer thickness s is obtained as a numerical value equation (cm; Hz):

$$s = \frac{6.4 k_1}{\sqrt{f}}$$

The correction factor $k_1$ is dependent on the conductor material used and is, for example, standardized for silver $k_1=1.0$ and for gold $k_1=1.17$. In addition, the specific surface resistivity Q' is defined as the resistance of a piece of the surface of the thickness s with the length 1 cm and the width 1 cm. Therefore, for $\mu_r=1$ and with the conductivity N(s/M) the following applies $$Q' = \frac{1}{Ns} = 2.5 \, 10^7 k_1 \sqrt{f} \; (\Omega, Hz)$$

It is apparent from this that the resistance losses $\alpha_R$ of the inner conductor $\alpha_i$ and of the outer conductor $\alpha_a$ are essentially dependent on $\sqrt{f}$, and on the conductivity and thickness of the conductive layer which act in an inversely proportional fashion.

Given the same conductor materials, for $\alpha_R=\alpha_i+\alpha_a$ the following applies $$\alpha_R = \frac{2.5 \, 10^7}{2\pi} \sqrt{f} \, \frac{1}{D} + \frac{1}{d} \sqrt{\frac{C'}{L'}}$$

In the case of conductors with rough surfaces, the current paths are longer and the equivalent resistances and losses are greater than in the case of conductors with smooth surfaces. Contact points should therefore have short current paths.

The effect of the dielectric losses in the conductance per unit length G' is generally described by means of the expression $$\alpha_G = \pi f \sqrt{L'C'} \tan \delta_\in$$

The conductance losses grow proportionally with f if $\delta_\in$ is approximately independent of the frequency.

Reflection Factor

As a determining value for the quality of a coaxial connection, the reflection factor r which is related to the nominal value of the characteristic impedance $Z_L$ is defined as:

$$|r| = \frac{Z - Z_L}{Z + Z_L}.$$

with Z as the measured characteristic impedance at the respective location of the line and $Z_L$ is the characteristic impedance on the line (nominal value).

Likewise, the reflection factor can be determined by acquiring the voltage distribution along a measuring line:

$$|r| = \frac{U_{max} - U_{min}}{U_{max} + U_{min}}.$$

Measuring methods for this are defined by DIN 47275 part 3. In this context, the variables of the ripple factor $$s = \frac{U_{max}}{U_{min}} = \frac{1 + |r|}{1 - |r|}$$

and adaptation factor $$m = \frac{U_{min}}{U_{max}} = \frac{1 - |r|}{1 + |r|}$$

are defined. The smaller the reflection factor at a frequency the better the coaxial connection system.

Further embodiments make use of these relationships by sensing changes in the field lines or changes in the attenuation of the coaxial wave as a function of the effect of the acceleration.

In the steering wheel rim 10, the dielectric 30, 30A, 30B influences the propagation of the coaxial wave.

Figure 4:
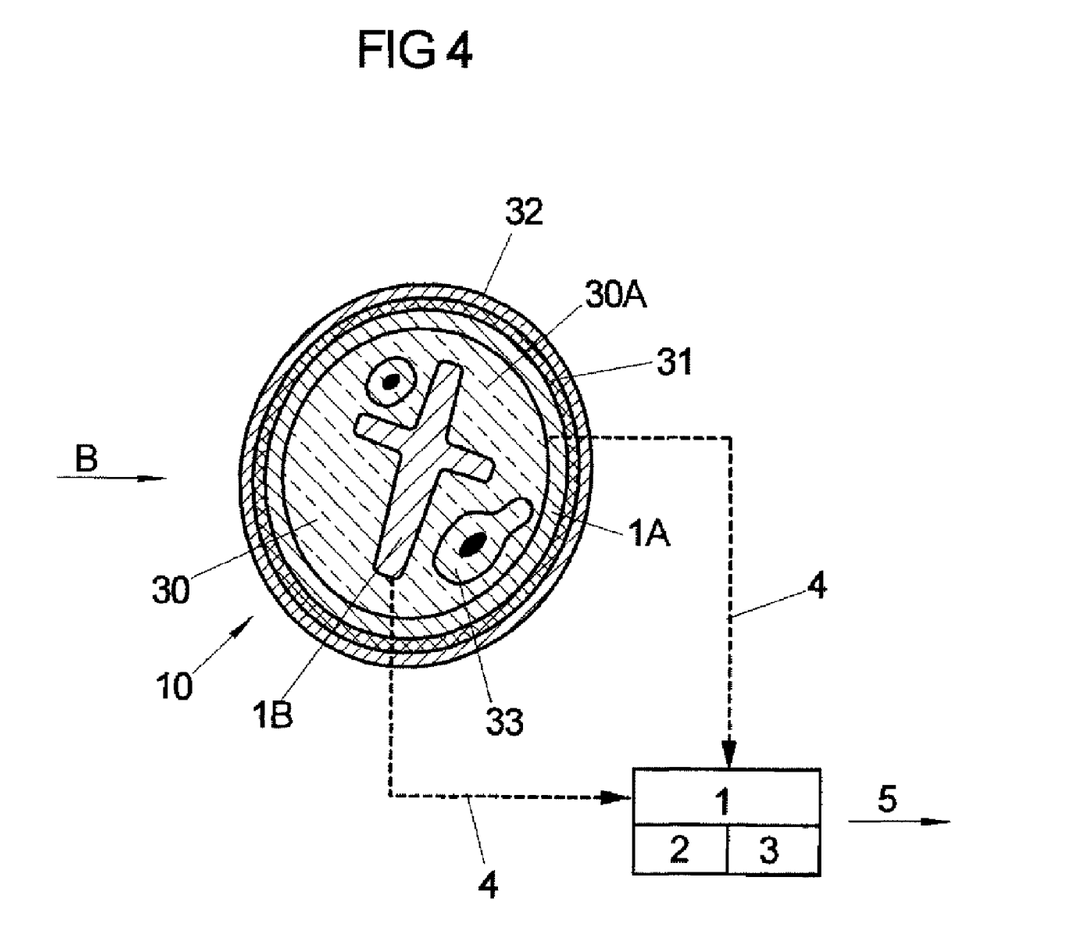
FIG. 4 is a cross section through a steering wheel rim with small liquid pockets according to the third embodiment.

A third embodiment which utilizes these effects is illustrated in FIG. 4. The basic design of the skeleton 1B as an inner conductor, an outer conductor 1B and the first dielectric element 30A correspond to the subject matter of FIGS. 1 and 2.

In a third embodiment according to FIG. 4, cavities 33 which are filled with liquid are arranged as the dielectric element 30A in the foamed material layer. Alternatively, liquid hoses can also be included.

In the event of an impact, the filled cavities 33 in the steering wheel rim experience a force effect owing to the acceleration. The dielectric properties in the steering wheel rim 10 therefore change, which in turn leads to a detectable change in the wave propagation; signals are changed or delayed.

These changes in the signals can additionally or alternatively be used for the signals which result from deformations owing to the capacitive or inductive signals.

These changes in the signals can also additionally be used for the changes in the characteristic resistance due to changes in the geometry.

Figure 5:
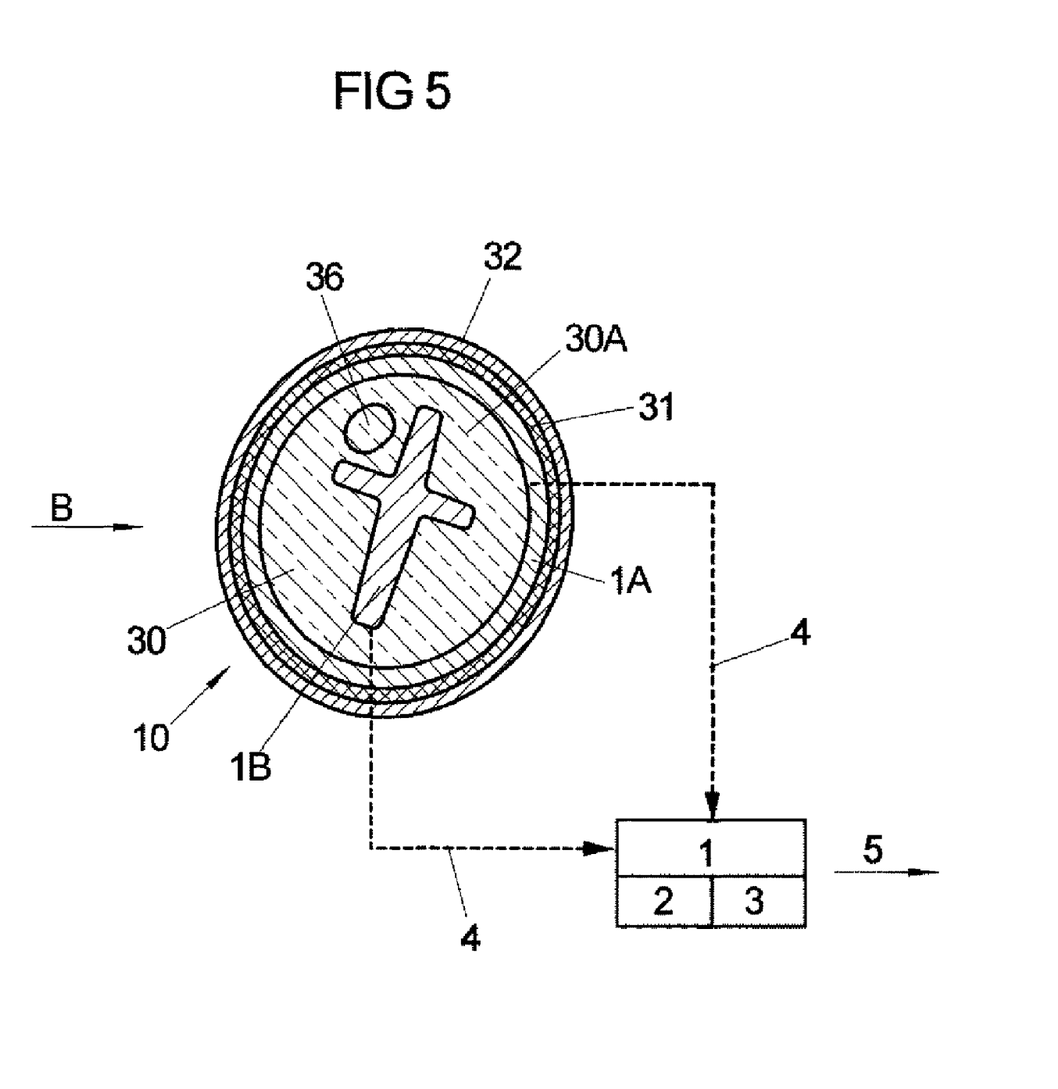
FIG. 5 is a cross section through a steering wheel rim with an antenna loop.

FIG. 5 is a schematic illustration of a fourth embodiment in which, for example, an antenna loop 36 is arranged in the interior of the steering wheel 10 in addition to the skeleton, it being possible to couple said antenna loop 36 to the skeleton 1B. This antenna emits a wave, and in the event of a crash the wave properties of the field lines of the emitted field change. These changes (frequency dependent or non-frequency dependent) can be detected in a direction-indicating fashion as effects of accelerations and can be used within the scope of a crash sensor. This embodiment therefore does not emerge directly from a coaxial arrangement.

All the illustrated embodiments have in common the fact that it is possible to define a threshold value below which the sensor system does not output a crash signal. Therefore, the steering wheel can be deformed through normal loading when driving, in which case the deformation variable and/or the deformation speed are clearly differentiated from those in impact events.

Figure 6:
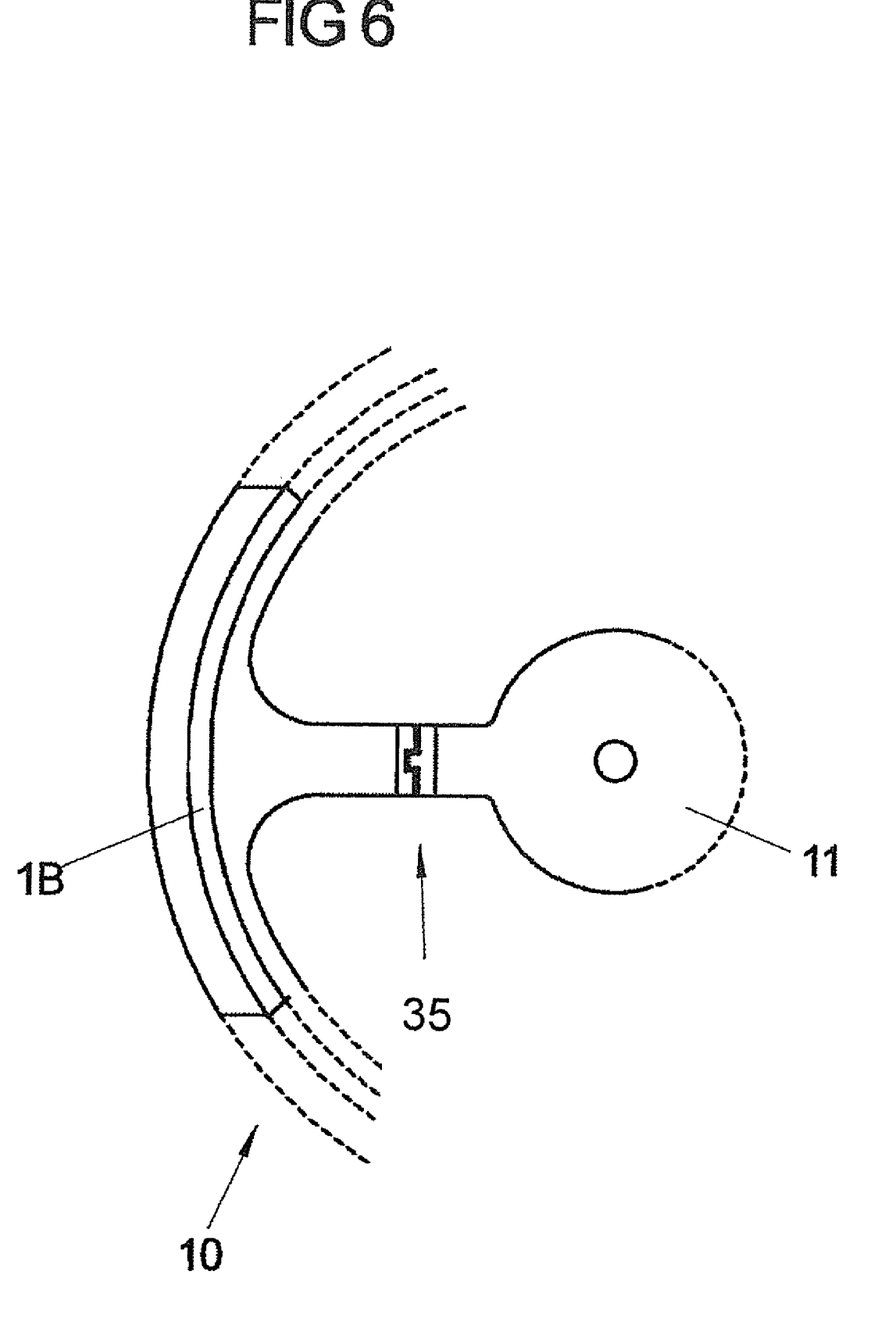
FIG. 6 is a schematic illustration of the decoupling of the steering wheel rim from the steering wheel plate.

FIG. 6 illustrates how a means of electrically isolating the steering wheel rim 10 from the plate 11 can be embodied. In this context, an electrically nonconductive section, which insulates the plate 11 electrically from the steering wheel, is introduced into a spoke 35 of the steering wheel.

Figure 7:
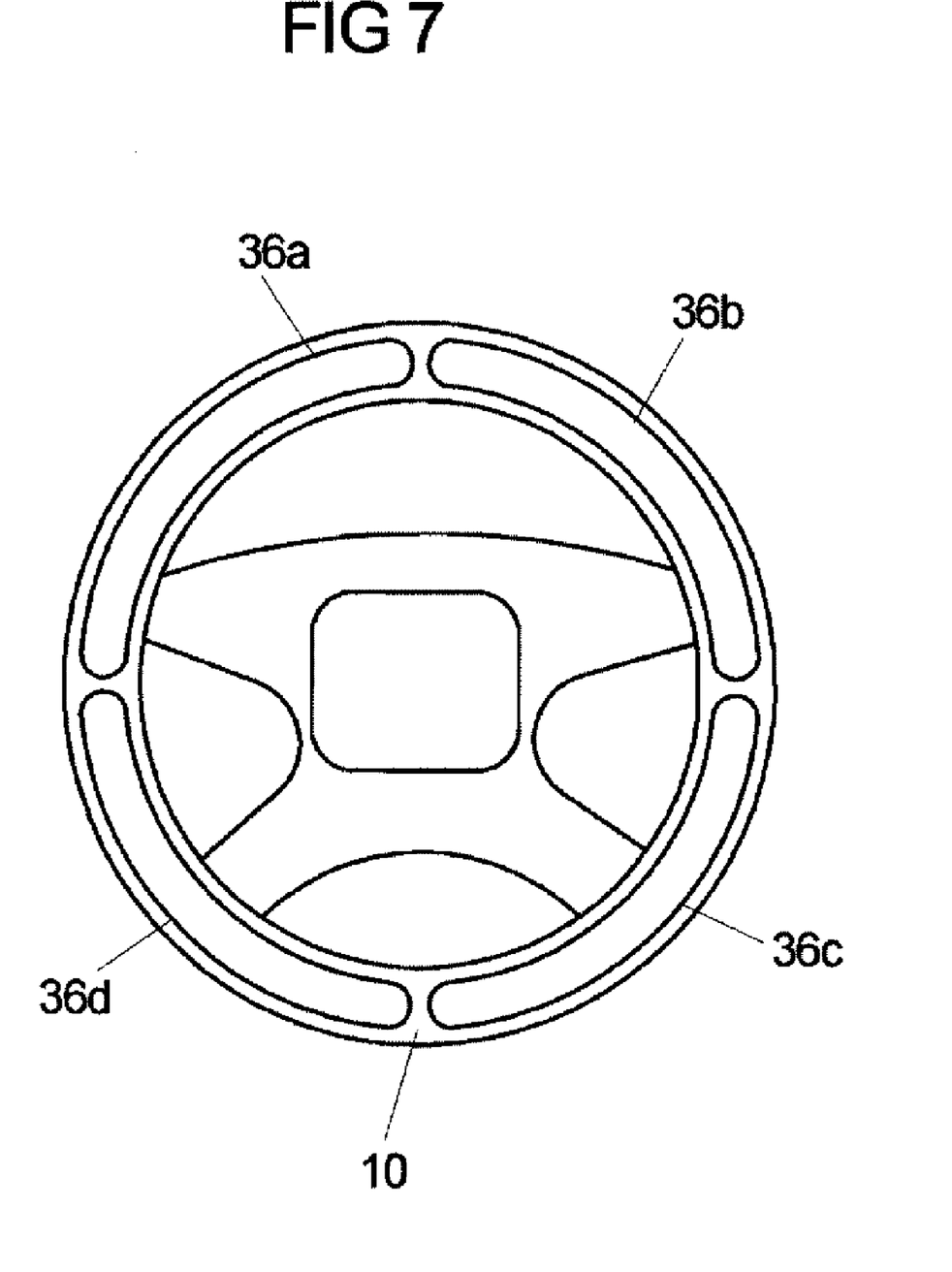
FIG. 7 is a schematic illustration of a steering wheel with four integrated conductor loops.

FIG. 7 illustrates an embodiment in which four conductor loops 36a, 36b, 36c, 36d are arranged in the steering wheel rim 10. The conductor loops 36a, 36b, 36c, 36d are each arranged in the four quadrants. When the steering wheel moves it is possible to detect the position of the respective conductor loops 36a, 36b, 36c, 36d so that, for example, information about the type of crash event (head-on crash, side crash, roll over etc.) can also be derived from this position information.

The invention is not restricted in its embodiment to the preferred exemplary embodiments specified above. Instead, a number of variants are conceivable which also make use of the sensor system according to the invention in embodiments which are basically of a different nature.

The invention claimed is:

1. A sensor system for a steering wheel of a motor vehicle, characterized in that at least one acceleration sensor for sensing acceleration acting on the vehicle is mounted to a rim of the steering wheel, and the steering wheel rim has at least one electrical outer conductor and at least one electrical inner conductor for forming a coaxial arrangement.

2. The sensor system as claimed in claim 1, characterized in that the acceleration sensor senses the field effect, the force effect and/or the resulting deformation of part of the steering wheel relative to the at least one outer conductor and/or to the at least one inner conductor.

3. The sensor system as claimed in claim 1, characterized in that the acceleration sensor senses a distance between two parts of the steering wheel rim.

4. The sensor system as claimed in claim 1, characterized in that a skeleton of the steering wheel rim is embodied at least partially as the inner conductor.

5. The sensor system as claimed in claim 1, characterized in that an electrically conductive material is embodied in the steering wheel rim, at least partially as the outer conductor.

6. The sensor system as claimed in claim 5 wherein the electrically conductive material comprises a steering wheel heating device.

7. The sensor system as claimed in claim 1, characterized in that at least one dielectric element is arranged in the steering wheel rim.

8. The sensor system as claimed in claim 7, characterized in that the dielectric element is arranged as a foamed material jacket and/or liquid container in the steering wheel rim.

9. The sensor system as claimed in claim 1, characterized in that the steering wheel rim is electrically insulated with respect to a steering wheel plate.

10. The sensor system as claimed in claim 1, characterized in that a triggering signal which is generated by sensor means fires an airbag and/or triggers passive or active safety systems.

11. The sensor system as claimed in claim 10, characterized in that the triggering signal is not output by the acceleration sensor until the acceleration exceeds a predetermined value.

12. A sensor system for a steering wheel of a motor vehicle, characterized in that at least one acceleration sensor for sensing acceleration acting on the vehicle is mounted to a rim of the steering wheel, and the at least one acceleration sensor has a capacitive and/or an inductive sensor unit or is coupled to a capacitive and/or inductive sensor unit, wherein the sensor unit is configured to receive a frequency-independent signal or a frequency-dependent signal.

13. The sensor system as claimed in claim 12, characterized in that the capacitive and/or inductive sensor unit are coupled to parts of the steering wheel.

14. The sensor system as claimed in claim 13 wherein the parts to which the capacitive and/or inductive sensor unit is coupled comprise the at least one outer conductor and the at least one inner conductor, with different masses, rigidities and/or densities to permit a signal for sensing the acceleration to be generated from the deformation of the parts.

15. A sensor system for a steering wheel of a motor vehicle, characterized in that at least one acceleration sensor for sensing acceleration acting on the vehicle is mounted to a rim of the steering wheel, and the acceleration sensor comprises a transmitting means has at least one antenna loop for emitting a coaxial wave, a TE wave, a TM wave, a TEM wave and/or a wave, and a sensor for detecting a reflection of the coaxial wave, of the TE wave, of the TM wave, of the TEM wave and/or of the wave.

16. The sensor system as claimed in claim 15, characterized in that at least two conductor loops are arranged in the steering wheel rim.

17. The sensor system as claimed in claim 15, characterized in that four conductor loops are arranged symmetrically in the steering wheel rim, each in a quadrant.

18. The sensor system as claimed in claim 15, characterized in that at least one antenna loop and/or a conductor loop is configured to be used for direction-indicating detection of a force effect.

19. The sensor system as claimed in claim 15, characterized in that a receiver means senses a reflection factor.

20. The sensor system as claimed in claim 15, characterized in that a receiver means senses a change in a property of the coaxial wave.

21. The sensor system as claimed in claim 20 wherein the property of the coaxial wave sensed by the receiver means comprises a field line change and/or attenuation as a function of a relative movement of parts of the steering wheel.

22. A steering wheel for a motor vehicle, the steering wheel comprising:
- a rim;
- at least one acceleration sensor mounted to the rim for sensing acceleration acting on the rim; and
- at least one electrical outer conductor and at least one electrical inner conductor of the at least one acceleration sensor that form a coaxial relationship.

* * * * *